United States Patent [19]
Cecil

[11] Patent Number: 5,828,028
[45] Date of Patent: Oct. 27, 1998

[54] HOT FORGING METHOD AND APPARATUS

[76] Inventor: Dimitrios G. Cecil, 1277 Ashover Dr., Bloomfield Hills, Mich. 48304

[21] Appl. No.: 669,575

[22] Filed: Jun. 24, 1996

[51] Int. Cl.$^6$ .................................................. B23K 11/14
[52] U.S. Cl. ........................ 219/110; 219/117.1; 219/157
[58] Field of Search .................................. 219/67, 86.41, 219/109, 110, 117.1, 157

[56] References Cited

U.S. PATENT DOCUMENTS

| | | | |
|---|---|---|---|
| 2,405,033 | 7/1946 | Grimes | 219/157 X |
| 2,842,629 | 2/1958 | Wellman | 219/157 X |
| 3,433,921 | 3/1969 | Peterson | 219/110 |
| 3,435,871 | 4/1969 | Johnson | 151/41.7 |
| 3,878,355 | 4/1975 | Andrew et al. | 219/79 |
| 4,028,522 | 6/1977 | Chihoski et al. | 219/109 |
| 4,214,142 | 7/1980 | Crosby et al. | 219/86.25 |
| 4,296,304 | 10/1981 | Defourny | 219/86.41 |
| 4,317,980 | 3/1982 | Goodrich et al. | 219/117.1 |
| 4,447,700 | 5/1984 | Cohen | 219/117.1 |
| 4,461,944 | 7/1984 | Cohen | 219/110 |
| 4,542,277 | 9/1985 | Cecil | 219/109 |
| 4,684,778 | 8/1987 | Cecil | 219/89 |
| 4,734,555 | 3/1988 | Ferguson | 219/109 |
| 4,841,113 | 6/1989 | Hamada et al. | 219/110 |
| 4,861,959 | 8/1989 | Cecil | 219/89 |
| 4,947,019 | 8/1990 | Akiyama et al. | 219/114 |
| 5,063,279 | 11/1991 | Rossi | 219/86.51 |
| 5,220,145 | 6/1993 | Cecil et al. | 219/110 |
| 5,288,968 | 2/1994 | Cecil | 219/89 |
| 5,308,948 | 5/1994 | Kawagoe et al. | 219/110 |
| 5,360,156 | 11/1994 | Ishizaka et al. | 228/17.5 |
| 5,360,958 | 11/1994 | Bogue et al. | 219/86.51 |
| 5,376,766 | 12/1994 | Higgins | 219/61.5 |
| 5,393,950 | 2/1995 | Killian | 219/110 |
| 5,493,093 | 2/1996 | Cecil | 219/110 |
| 5,558,785 | 9/1996 | Killian et al. | 219/110 |

OTHER PUBLICATIONS

C.L. Tsai, W.L. Dai, D.W. Dickinson, "Analysis and Development of a Real–Time Control Methodology in Resistance Spot Welding", SAE Technical Paper Series, No. 910191.

A. Stiebel, C. Ulmer, D. Kodrack and B. Holmes, "Monitoring and Control of Spot Weld Operations", SAE Technical Paper Series, No. 860579.

C.L. Tsai, W.L. Dai, D. W. Dickinson and J. C. Papritan, "Analysis and Development of a Real–Time Control Methodology in Resistance Spot Welding", Welding Research Supplement, Dec. 1991.

Lucas Schaevitz, LVDT (Linear Variable Displacement Transducer) Operating Instructions, Jul. 1994.

C.L. Tsai, O.A. Jammal, J.C. Papritan and D.W. Dickinson, "Modeling Resistance Spot Weld Nugget Growth", Welding Research Council, Bulletin 361, Feb. 1992, pp. 47–54.

David Bacon, "Controlling Resistance Welds With Deflection Feedback", Square D Company, Sep. 11, 1991.

A.E. Bentley, "Control of Pinch Welding Uses Quantitative Feedback Theory", Welding Journal, Jun. 1991, pp. 51–63.

*Primary Examiner*—Gregory L. Mills
*Attorney, Agent, or Firm*—Brooks & Kushman P.C.

[57] ABSTRACT

An apparatus and method for resistance welding and then hot forging first and second workpieces together is disclosed. The first workpiece is provided with a deformable rivet. The second workpiece is provided with an aperture sized to receive the deformable rivet. The first and second workpieces are placed together with the deformable rivet of the first workpiece extending through the aperture in the second workpiece. A resistance heating power supply having a pair of power output terminals is provided. One of the terminals is connected in electrical communication with the first workpiece and the other one of the terminals is connected to a hot forging electrode. The hot forging electrode is movable relative to the deformable rivet. The hot forging electrode is affixed to an actuator. The actuator shifts the hot forging electrode into and out of engagement with the deformable rivet. A transducer provides an output indicative of the position of the hot forging electrode to determine rivet deformation. The controller cooperates with the transducer and the resistance heating power supply wherein the controller regulates the power output of the resistance heating power supply as a function of rivet deformation to ensure that the deformable rivet properly deforms.

9 Claims, 4 Drawing Sheets

HOT FORGING METHOD AND APPARATUS

TECHNICAL FIELD

The present invention relates generally to hot forging and, more particularly, to an apparatus and method of hot forging workpieces together.

BACKGROUND ART

During the production of axle assemblies for vehicles an axle tube is joined to an axle housing. Since a defective assembly is expensive to replace once it is incorporated into a larger unit, ensuring that the tube is properly joined to the housing is imperative. Inclusion of defective assemblies into a line of production vehicles, for example, can result in expensive warranty repairs or product recall.

A problem in finding defective assemblies before they are incorporated into a larger unit is that they may only be identified through destructive testing. However, the assembly cannot be used again after destructive testing. Therefore, destructive testing is only employed randomly on a group of assemblies to predict the occurrence of defective assemblies in the group. Because destructive testing is unreliable and wasteful, a defective assembly will probably not be discovered until its failure during operation.

MIG welding has been used in the past in the production of axle assemblies. In the MIG welding process, a welding gun having an electrode forms an arc of intense heat. The end of an axle tube supplying an inert shield gas is placed at the opening of the housing. The arc melts the metal surfaces forming a molten puddle at the interface between the parts. As the puddle cools, coalescence occurs and the tube is joined to the housing. A primary disadvantage with this process is that when it is done manually it relies on the skill of a welder to decide the quality of the weld. This process is also disadvantageous when performed in an automated mode in which the welding gun is controlled by a robot because of the inability to ensure that the parts are properly welded together.

Resistance welding with a cylindrical plug is another process used in the production of axle assemblies. In this process, a housing having a neck that forms an opening for receiving the tube is provided. An aperture is formed on the neck of the housing to receive the plug. The tube is press-fit into the opening and the plug is inserted into the aperture. Electrodes then apply pressure to force the plug against the tube while electrical current passes through the interface between the plug and the tube. Heat generated by the current deforms the plug as the interface reaches a plastic state. The plug cools to become welded to the tube after the current is shut off. The welded plug acts like a fastener to secure the tube to the housing.

Since resistance welding in the manufacture of assemblies is usually done automatically, good quality welds do not depend on the skill of the operator. Rather, weld quality depends on the proper setup of the equipment and adherence to a weld schedule. However, a problem associated with automated resistance welding operations currently being used is that weld strength varies dramatically from part to part due to changing surface conditions at the faying surface and variations in metallurgy. The strength variations may also be a result of variations in the current applied to the parts. The current variations may be due to such things as transient loading or surging of a power line though a common weld schedule is programmed for a predetermined level of current.

SUMMARY OF THE INVENTION

Accordingly, a process configured to monitor and regulate the amount of plug deformation can be used to ensure that the parts are properly joined together.

It is an object of the present invention to provide an apparatus and method to regulate the power applied to the deformable rivet as a function of rivet deformation to ensure that the deformable rivet properly deforms.

It is another object of the present invention to provide an apparatus and method to monitor and regulate the amount of rivet deformation of a deformable rivet to ensure that the deformable rivet is properly joined to a workpiece.

It is still another object of the present invention to provide an apparatus and method for ensuring that workpieces that are improperly joined are identified.

It is still yet another object of the present invention to provide a method of joining an axle tube to an axle housing.

In carrying out the above objects and other objects and features of the present invention, a joining apparatus for hot forging first and second workpieces together is provided in which the first workpiece has a deformable rivet and the second workpiece has an aperture sized to receive the deformable rivet.

The joining apparatus includes an assembly fixture for supporting the first and second workpieces to be joined with the deformable rivet of the first workpiece extending through the aperture in the second workpiece. A resistance heating power supply having a pair of power output terminals is provided. One of the pair of power output terminals is in electrical communication with the first workpiece. A hot forging electrode is connected to the other one of the resistance heating power supply power output terminals. The hot forging electrode is movable relative to the deformable rivet. An actuator is affixed to the hot forging electrode. The actuator shifts the hot forging electrode into and out of engagement with the deformable rivet. A transducer having an output indicative of the position of the hot forging electrode to determine rivet deformation is provided. A controller cooperates with the transducer and the resistance heating power supply. The controller regulates the power output of the resistance heating power supply as a function of rivet deformation to ensure that the deformable rivet properly deforms.

A method of hot forging first and second workpieces together is also provided. The method includes the steps of placing the first and second workpieces together with the deformable rivet of the first workpiece extending through the aperture in the second workpiece to engage the first workpiece. A hot forging electrode is then shifted into engagement with the deformable rivet. The hot forging electrode is movable relative to the deformable rivet. A resistance heating power supply is in electrical communication with the hot forging electrode and the first workpiece. Power output from the resistance heating power supply then heats the deformable rivet. The position of the hot forging electrode is then monitored to determine rivet deformation. The power output of the resistance heating power supply is then regulated as a function of rivet deformation to ensure that the deformable rivet properly deforms.

The advantages accruing to the present invention are numerous. For example, the weld quality of workpieces joined together can be ensured by detecting the physical characteristics of the workpieces rather than relying on the skill of a welder or upon an automated system using a weld schedule that does not take into account the variances between the workpieces and in the power supply conditions.

The above objects and other objects, features and advantages of the present invention will be readily appreciated by one of ordinary skill in the art from the following detailed description of the best modes for carrying out the invention when taken in connection with the accompanying drawings.

BEST MODES FOR CARRYING OUT THE INVENTION

Figure 1:
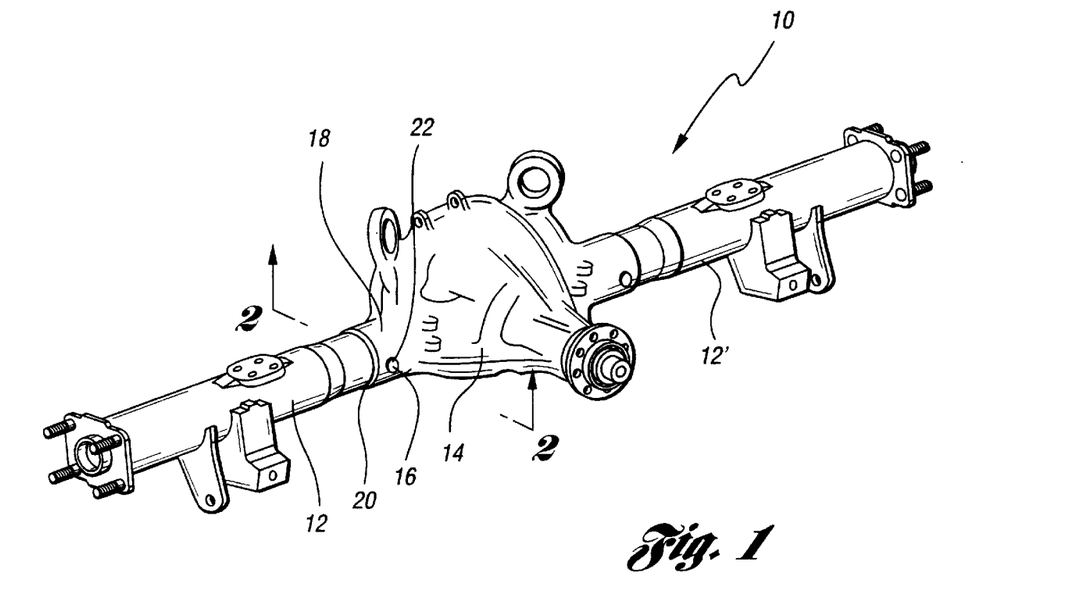
FIG. 1 is a perspective view of an axle assembly having an axle tube joined to an axle housing.
Figure 2:
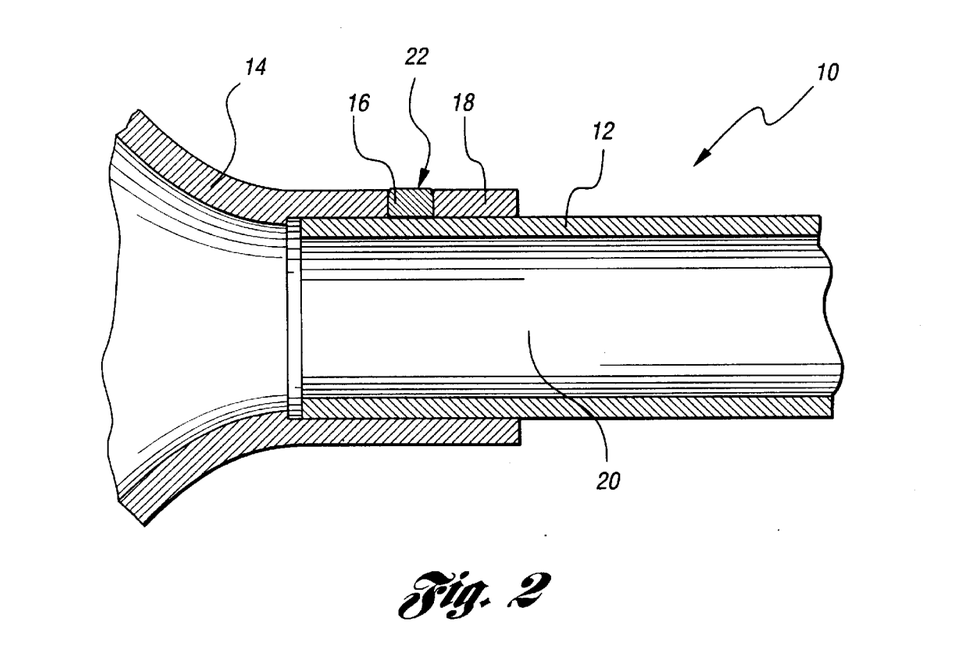
FIG. 2 is a cross-sectional view of the axle assembly shown in FIG. 1 along the line 2—2.

A perspective view of an axle assembly 10 is shown in FIGS. 1 and 2. Axle assembly 10 includes axle tubes 12 and 12' and an axle housing 14. Axle tube 12' will not be discussed for simplicity. Axle tube 12 is provided with a deformable rivet 16. Deformable rivet 16 is a cylindrical plug, ball, or the like made of a metal or other material suitable for welding to axle tube 12. Axle housing 14 has a neck 18 that forms an opening 20 to receive axle tube 12. An aperture 22 sized to receive deformable rivet 16 is on neck 18.

An end portion of axle tube 12 is press-fit or inserted into opening 20 of axle housing 14. Deformable rivet 16 extends through aperture 22 in neck 18 of axle housing 14 to meet axle tube 12. Deformable rivet 16 is then welded to axle tube 12 through axle housing 14 causing axle tube 12 to be joined to axle housing 14.

Although only one deformable rivet extends through aperture 22, more apertures may be provided to fit respective deformable rivets.

As shown clearly in the cross-sectional view of axle assembly 10 of FIG. 2, deformable rivet 16 acts like a fastener in aperture 22 of neck 18 to secure axle tube 12 to axle housing 14. The loading strength of deformable rivet 16 depends upon the amount of rivet deformation. As will be described in detail below, the amount of deformation of deformable rivet 16 is equal to the change in its position between an initial position and a final position. Deformable rivet 16 is in the initial position when it meets axle tube 12. Deformable rivet 16 is in the final position when it is welded to axle tube 12. The change in position is caused by heat and pressure acting in conjunction on deformable rivet 16.

Figure 3:
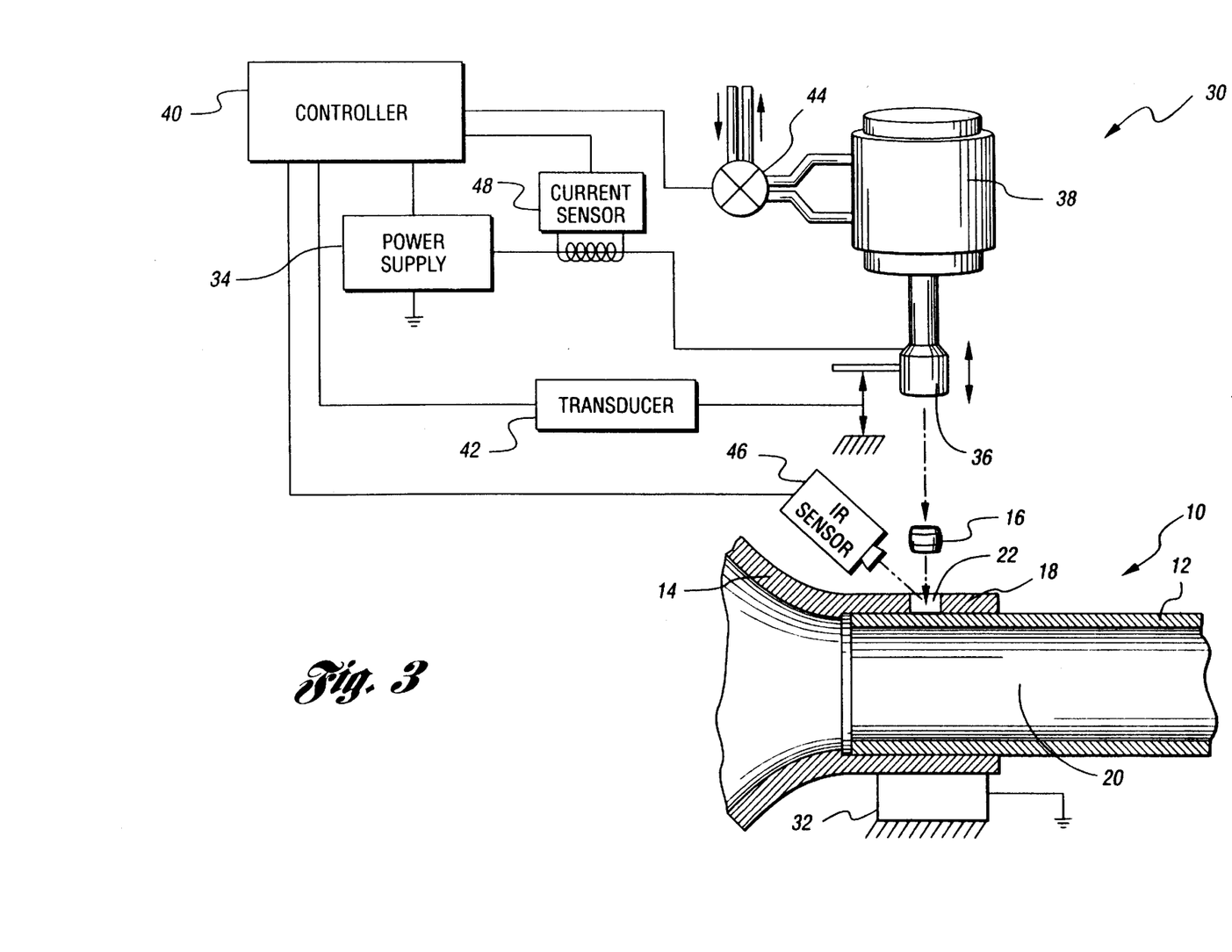
FIG. 3 is a schematic block diagram illustrating a joining apparatus according to the present invention.

Referring now to FIG. 3, a schematic block diagram illustrating a joining apparatus 30 for joining axle tube 12 to axle housing 14 is shown. Joining apparatus 30 includes an assembly fixture 32 for supporting axle tube 12 and axle housing 14 after the portion of axle tube 12 is inserted within opening 20. Assembly fixture 32 is mechanically secured to hold axle assembly 10. Assembly fixture 32, axle tube 12, and axle housing 14 form a conductive path for electricity to travel.

Joining apparatus 30 further includes a resistance heating power supply 34. Power supply 34 is a readily obtainable component from various resistance welding component manufacturers such as Weltronic, Medar, or Square D. Power supply 34 has a pair of power output terminals. One of the pair of power output terminals is connected to assembly fixture 32 in electrical communication with axle tube 12. The other one of the pair of power output terminals is connected to a hot forging electrode 36.

An actuator 38 in the form of a fluid powered cylinder or the like has an output member affixed to hot forging electrode 36. Actuator 38 shifts hot forging electrode 36 into and out of engagement with deformable rivet 16 to force it against axle tube 12. When actuator 38 shifts hot forging electrode 36 into engagement with deformable rivet 16, a closed electrical circuit forms between power supply 34, hot forging electrode 36, deformable rivet 16, axle housing 14, axle tube 12, and assembly fixture 32. So, power output from power supply 34 may then be applied to heat the faying surface, i.e., the interface between deformable rivet 16 and axle tube 12. The heat causes deformable rivet 16 to deform as will be explained in greater detail below.

Hot forging electrode 36 is movable relative to deformable rivet 16 to track the deformation of deformable rivet 16. When hot forging electrode 36 engages deformable rivet 16, the deformation of deformable rivet 16 is equal to the change in the position of hot forging electrode 36. Hence, the deformation of deformable rivet 16 can be determined by knowing the position of hot forging electrode 36.

A controller 40 cooperates with power supply 34 to regulate the power output of power supply 34. Controller 40 also cooperates with actuator 38 to regulate its movement. Controller 40 is a readily available component obtainable from various controller manufacturers such as Allen Bradley, Square D, Modicon, or Fanuc. Controller 40 may be a programmable logic controller (PLC) having associated A/D converters and a programmed instruction card or a personal computer (PC).

In a preferred embodiment, joining apparatus 30 includes a transducer 42 operative with hot forging electrode 36. Transducer 42 provides an output indicative of the position of hot forging electrode 36. Transducer 42 is a sensor such as a Linear Variable Deformation Transducer (LVDT) described in U.S. Pat. Nos. 5,288,968; 5,220,145; 4,684,778; and 4,542,277; all of which are issued to the present Applicant, which are incorporated herein for describing transducer 42 and related control logic.

Controller 40 cooperates with transducer 42 to determine the position of hot forging electrode 36. After actuator 38 shifts hot forging electrode 36 into engagement with deformable rivet 16 and after power supply 34 applies power, controller 40 monitors the position of hot forging electrode 36 to determine the deformation of deformable rivet 16. The deformation of deformable rivet 16 equals the change in position of hot forging electrode 36 when hot forging electrode 36 is engaged to deformable rivet 16. Controller 40 regulates the power output of power supply 34 as a function of rivet deformation to ensure that deformable rivet 16 properly deforms. Controller 40 regulates the power output of power supply 34 by varying the power level and the power duration.

Joining apparatus 30 further includes a pressure regulator 44 cooperating with controller 40 for varying the force exerted by hot forging electrode 36 on deformable rivet 16. Pressure regulator 44 can be set repeatedly to have actuator 38 apply differing amounts of pressure. Controller 40 cooperates with pressure regulator 44 to vary the force on deformable rivet 16 as a function of time and of rivet deformation.

In an alternative embodiment, joining apparatus 30 includes an Infra-Red (IR) temperature sensor 46. Temperature sensor 46 is pointed at deformable rivet 16 to generate a temperature signal indicative of the temperature of deformable rivet 16. The temperature of deformable rivet 16 may change to more than 2000° F. from room temperature during the welding process.

Controller 40 uses the temperature signal to determine rivet deformation by comparing the temperature of deformable rivet 16 with a known deformation pattern. The known deformation pattern is the deformation pattern of a typical deformable rivet subjected to a pressure as a function of its temperature. Controller 40 matches the temperature of deformable rivet 16 to a temperature value in the known pattern to predict the deformation of deformable rivet 16. Since the dimensions and deformation sequences are consistent among deformable rivets, the prediction of the deformation of deformable rivet 16 made by controller 40 is highly accurate. Thus, controller 40 uses the temperature signal to regulate the power output from power supply 34 as a function of rivet deformation to ensure the deformable rivet 16 properly deforms.

In another alternative embodiment, joining apparatus 30 includes an electric current sensor 48. Current sensor 48 is an inductor and it is operative with one of the power output terminals. Current sensor 48 generates a power consumption signal proportional to the power output from power supply 34 during the welding process.

Controller 40 uses the power consumption signal to determine rivet deformation by comparing the power applied to deformable rivet 16 with another known deformation pattern. This known deformation pattern is the deformation pattern of a typical deformable rivet subjected to a pressure as a function of the power applied. Controller 40 matches the power applied to deformable rivet 16 to a power value in the known pattern to predict the deformation of deformable rivet 16. Controller 40 uses the power consumption signal to regulate the power output of power supply 34 as a function of rivet deformation to ensure that deformable rivet 16 properly deforms.

Figure 4:
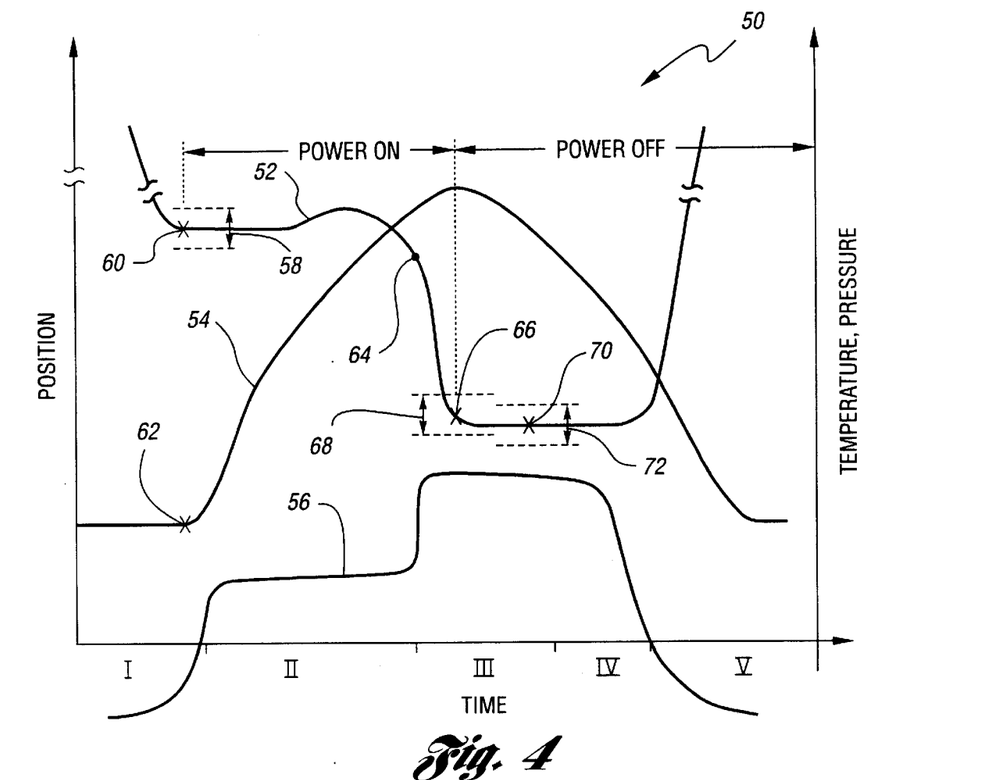
FIG. 4 is a graph illustrating the position of the hot forging electrode as a function of rivet deformation, the rivet temperature, and the pressure on the deformable rivet during the deformation sequence.

Referring now to FIG. 4, the operation of joining apparatus 30 will be discussed in greater detail. FIG. 4 is a graph 50 having an electrode position curve 52, a rivet temperature curve 54, and a pressure curve 56. Electrode position curve 52 illustrates the position of hot forging electrode 36 as a function of rivet deformation over time. As indicated above, the position of hot forging electrode 36 tracks the rivet deformation when hot forging electrode 36 is engaged with deformable rivet 16. Rivet temperature curve 54 illustrates the temperature of deformable rivet 16 over time. Pressure curve 56 illustrates the pressure on deformable rivet 16 over time.

The time axis is divided into five intervals. The first interval "I" is the fit-up interval. During this interval, axle tube 12 is inserted into opening 20 of axle housing 14 mounted on assembly fixture 32. Deformable rivet 16 is placed in aperture 22 while actuator 38 holds hot forging electrode 36 out of engagement with deformable rivet 16.

Controller 40 then commands actuator 38 to shift hot forging electrode 36 into engagement with deformable rivet 16. Actuator 38 responds by moving hot forging electrode 36 until it rests on deformable rivet 16. Thus, deformable rivet 16 is in the initial fit-up position. Controller 40 monitors the initial position of hot forging electrode 36. If the initial position of hot forging electrode 36 falls within a predetermined initial fit-up range 58 such as initial position point 60 on position curve 52, then controller 40 commands power supply 34 to apply power as shown by "power on" point 62. Predetermined initial fit-up range 58 is indicative of a proper fit-up of deformable rivet 16.

The second interval "II" is the resistance welding interval. During this interval, hot forging electrode 36 applies a constant low pressure on deformable rivet 16. Preferably, for the manufacturing of axle assemblies according to the teachings of the present invention, the constant low pressure is around 2000 pounds per square inch (psi). Hot forging electrode 36 also applies the electrical current from power supply 34 to deformable rivet 16. Due to the resistance of deformable rivet 16, the power is dissipated into heat energy. The current heats deformable rivet 16 as shown by the rising slope of rivet temperature curve 54 in interval II.

The power applied by power supply 34 may be AC or DC electrical power. It may also take a variety of input patterns such as pulse, ramp, sinusoidal, sawtooth, etc. depending upon the application, the type of power supply, and on the thicknesses and type of materials used. Preferably, for the manufacturing of axle assemblies according to the teachings of the present invention, the power output is pulsed with a frequency of around 60 Hertz, a duty cycle of around 50%, and 18,000 to 25,000 amps RMS of secondary current. During interval II, power supply 34 applies power for around 15 to 20 cycles.

At the beginning of interval II deformable rivet 16 maintains its initial position. Deformable rivet 16 begins to expand slightly and then starts to contract once it reaches a sufficient temperature. The slight expansion and contraction are shown by electrode position curve 52 in interval II. After deformable rivet 16 initially expands it then softens and collapses under the application of a low pressure and power output. Because of the pressure and heat generated from the power output, deformable rivet 16 coalesces with axle tube 12 and becomes welded to it. This process is the basis of resistance welding.

Once deformable rivet 16 contracts to a sufficient level such as forge point 64 on position curve 52, controller 40 commands actuator 38 to step instantaneously the constant low pressure applied on hot forging electrode 36 to a constant high pressure. Preferably, for the manufacturing of axle assemblies according to the teachings of the present invention, the constant high pressure is around 3000–5000 psi, depending on the size of deformable rivet 16. Hot forging electrode 36 in turn applies the constant high pressure on deformable rivet 16. The pressure changing instantaneously from low to high on a sufficiently heated deformable rivet 16 is the basis of hot forging. However, it is not required for the low and high pressures to be constant. The instantaneous change of pressure is shown by pressure curve 56 at the beginning of the forging interval "III." Thus, an advantage of the present invention is that controller 40 monitors the deformation of deformable rivet 16 during the resistance welding interval to determine precisely when to command actuator 38 to step up the pressure.

Depending on the application, an increase in power output from power supply 34 may be required during the forging interval. If so, controller 40 will command power supply 34 to adjust the power output accordingly. Also, a delay of about one to five cycles may be required to allow deformable rivet 16 a chance to cool to properly coalesce with axle tube 12 before forging. If so, controller 40 will command power supply 34 accordingly.

Once actuator 38 applies the constant high pressure, deformable rivet 16 contracts rapidly. The rapid contraction is shown by the drastic change of position curve 52 at the beginning of interval III. Controller 40 receives the output of transducer 42 which monitors the contraction of deformable rivet 16. Controller 40 then commands power supply 34 to terminate the power once deformable rivet 16 contracts to a sufficient level such as calculated position point 66 on position curve 52. Calculated position point 66 is within a predetermined position range 68. The rivet temperature starts to decrease after the power output is terminated as shown by rivet temperature curve 54 in interval III.

After deformable rivet 16 has rapidly contracted to calculated position point 66 within predetermined position range 68, it gradually contracts under the high constant pressure of hot forging electrode 36 until it reaches final position point 70. Final position point 70 is within final position "envelope" 72 on electrode position curve 52. The position of hot forging electrode 36 falling within final position envelope 72 is indicative of proper rivet deformation. Controller 40 will identify axle assembly 10 as defective if the position of hot forging electrode 36 does not fall within final position envelope 72.

When the position of hot forging electrode 36 reaches final position point 70 or any other point within final position envelope 72, the cooling interval "IV" commences. During the cooling interval the temperature of deformable rivet 16 continues to decrease as shown by rivet temperature curve 54 in interval IV. Controller 40 commands actuator 38 to keep continuing to apply the constant high pressure on hot forging electrode 36. This allows deformable rivet 16 a chance to cool, and upon cooling, deformable rivet 16 becomes forged to axle tube 12. Thus, axle tube 12 is permanently joined to axle housing 14.

Controller 40 then commands actuator 38 to retract hot forging electrode 36. During this retraction interval "V," hot forging electrode 36 is shifted out of engagement with deformable rivet 16. Controller 40 monitors the position of hot forging electrode 36 to ensure that it actually has retracted to avoid any "stuck gun" conditions. A stuck gun condition occurs when hot forging electrode 36 becomes fused to deformable rivet 16. Controller 40 makes sure that hot forging electrode 36 has retracted before transfer of axle assembly 10 for operator and equipment safety. This allows axle assembly 10 to be removed from assembly fixture 32 and the operation of joining apparatus 30 can be repeated on a new axle assembly as desired.

The operation of a preferred embodiment of joining apparatus 30 having transducer 42 to monitor the position of hot forging electrode 36 by measuring the movement of hot forging electrode 36 has just been described. In an alternative embodiment, temperature sensor 46 may be used instead of transducer 42 to monitor the position of hot forging electrode 36. In another alternative embodiment, current sensor 48 may be used instead of transducer 42 to monitor the position of hot forging electrode 36. The difference among all of the embodiments is how the position of hot forging electrode 36 is obtained. So, graph 50 would still be the same no matter which embodiments are used.

Figure 5:
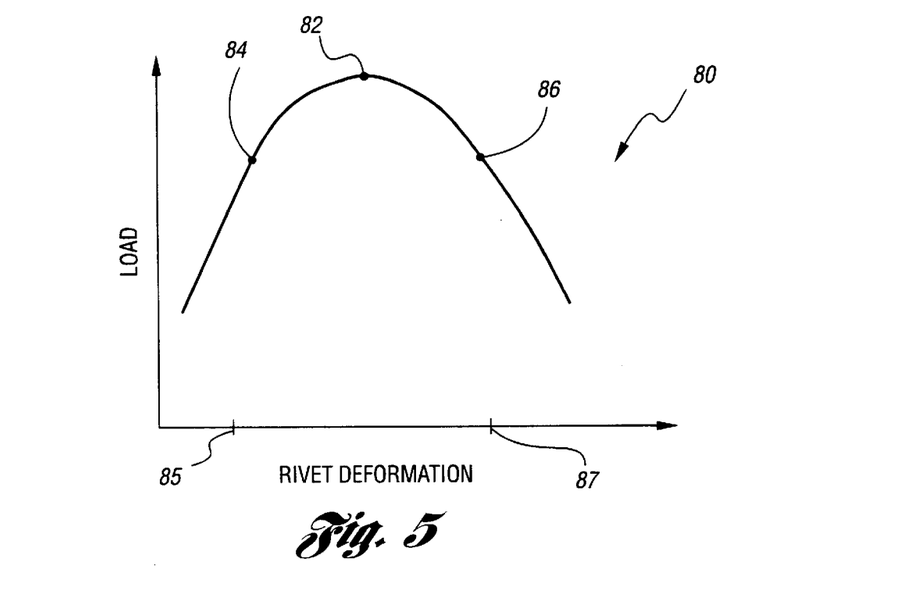
FIG. 5 is a graph illustrating the rivet deformation versus the load strength.

With continuing reference to FIG. 4, FIG. 5 shows a load graph 80 illustrating how the strength of a weld between deformable rivet 16 and axle tube 12 depends upon the amount of rivet deformation. A maximum strength point 82 is obtained when the rivet deformation reaches final position point 70 on electrode position curve 52. If the rivet deformation ends at a point on final position envelope 72 above final position point 70, then a first minimum strength point 84 is obtained at minimum rivet deformation 85. If the rivet deformation ends at a point on final position envelope 72 below final position point 70, then a second minimum strength point 86 is obtained at maximum rivet deformation 87. Thus, if the specifications of the application call for deformable rivet 16 to have a strength above either of the minimum strength points, a rivet deformation falling within final position envelope 72 will suffice. The rivet deformation will fall within final position envelope 72 when it lies between minimum rivet deformation 85 and maximum rivet deformation 87.

Figure 6:
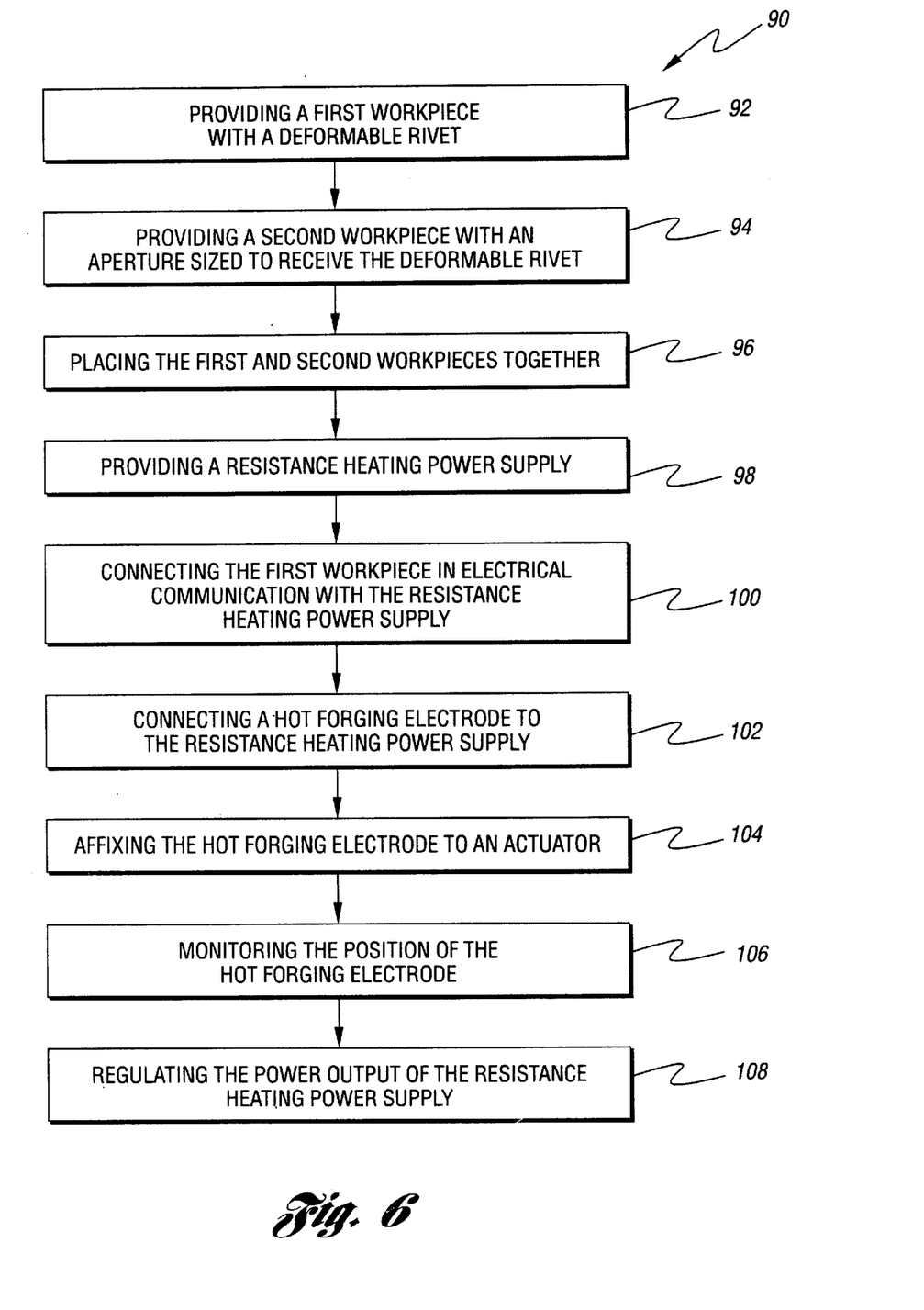
FIG. 6 is a flow chart illustrating a method according to the present invention.

Referring now to FIG. 6, a flow chart 90 illustrating a hot forging method of the present invention is shown. Hot forging method includes the steps of providing a first workpiece with a deformable rivet as shown in block 92 and providing a second workpiece with an aperture sized to receive the deformable rivet as shown in block 94. Next, the first and second workpieces are placed together with the deformable rivet of the first workpiece extending through the aperture in the second workpiece as shown in block 96.

A resistance heating power supply having a pair of power output terminals is then provided as shown in block 98. One of the power output terminals is connected in electrical communication to the first workpiece as shown in block 100. A hot forging electrode movable relative to the deformable rivet is then connected to the other one of the power output terminals as shown in block 102.

An actuator is then affixed to the hot forging electrode as shown in block 104. The actuator shifts the hot forging electrode into and out of engagement with the deformable rivet. The position of the hot forging electrode is then monitored to determine rivet deformation as shown in block 106. Finally, the power output of the resistance heating power supply is regulated as a function of rivet deformation to ensure that the deformable rivet properly deforms as shown in block 108.

The advantages of the apparatus and method of the present invention are numerous. For instance, the controller will regulate the power output based on rivet deformation to ensure that the rivet properly deforms. Therefore, the rivet deformation of a deformable rivet can be compared with a predetermined final position range to ensure that the deformable rivet can withstand a certain amount of destruction. Conversely, the rivet deformation of a deformable rivet falling outside the predetermined final position range can be monitored to identify the corresponding parts as defective. Here, the manufacturer's peace of mind is maintained because a possible future problem is avoided.

The present invention may also be applied to join a first workpiece having an integral deformable rivet to a second workpiece having a corresponding aperture for receiving the integral deformable rivet. Here, no separate deformable rivet is used.

It is to be understood, of course, that while the forms of the present invention described above constitute the preferred embodiments of the present invention, the preceding description is not intended to illustrate all possible forms thereof. It is also to be understood that the words used are words of description, rather than limitation, and that various changes may be made without departing from the spirit and scope of the present invention, which should be construed according to the following claims.

What is claimed is:

1. A joining apparatus for hot forging first and second workpieces together, wherein the first workpiece is provided with a deformable rivet and the second workpiece is provided with an aperture sized to receive the deformable rivet, the apparatus comprising:

an assembly fixture for supporting the first and second workpieces to be joined with the deformable rivet of the first workpiece extending through the aperture in the second workpiece;

a resistance heating power supply having a pair of power output terminals for providing power output, one of which being in electrical communication with the first workpiece;

a hot forging electrode connected to the other one of the resistance heating power supply power output terminals and movable relative to the deformable rivet;

an actuator affixed to the hot forging electrode for shifting the hot forging electrode into and out of engagement with the deformable rivet;

a pressure regulator cooperating with the actuator for varying a force exerted by the hot forcing electrode on the deformable rivet;

a transducer having an output indicative of position of the hot forging electrode to determine rivet deformation; and a controller cooperating with the transducer, the pressure regulator, and the resistance heating power supply, wherein the controller regulates the power output of the resistance heating power supply as a function of rivet deformation and regulates the force exerted by the hot forging electrode on the deformable rivet when the hot forcing electrode reaches a predetermined position to ensure that the deformable rivet properly deforms.

2. The apparatus of claim 1 wherein the controller regulates the power output of the resistance heating power supply by varying power level and power duration.

3. The apparatus of claim 1 wherein the transducer is a temperature sensor having an output indicative of the position of the hot forging electrode to determine rivet deformation by measuring temperature of the deformable rivet.

4. The apparatus of claim 1 wherein the transducer is an electric current sensor associated with one of the resistance heating power supply power output terminals, the electric current sensor has an output indicative of the position of the hot forging electrode to determine rivet deformation by measuring the power output from the resistance heating power supply.

5. A method of hot forging first and second workpieces together, wherein the first workpiece is provided with a deformable rivet and the second workpiece is provided with an aperture sized to receive the deformable rivet, the method comprising:

placing the first and second workpieces together with the deformable rivet of the first workpiece extending through the aperture in the second workpiece to engage the first workpiece;

shifting a hot forging electrode into engagement with the deformable rivet, the hot forging electrode being movable relative to the deformable rivet;

heating the deformable rivet with power output from a resistance heating power supply in electrical communication with the hot forging electrode and the first workpiece;

monitoring position of the hot forging electrode to determine rivet deformation; and regulating the power output of the resistance heating power supply as a function of rivet deformation and regulating a force exerted by the hot forging electrode on the deformable rivet when the hot forging electrode reaches a predetermined position to ensure that the deformable rivet properly deforms.

6. The method of claim 5 wherein regulating the power output of the resistance heating power supply includes varying power level and power duration.

7. The method of claim 5 wherein monitoring the position of the hot forging electrode to determine rivet deformation is done by monitoring temperature of the deformable rivet.

8. The method of claim 5 wherein monitoring the position of the hot forging electrode to determine rivet deformation is done by monitoring the power output from the resistance heating power supply.

9. A method of joining an axle tube to an axle housing, wherein the axle housing has a neck forming an opening to receive the axle tube and an aperture in the neck sized to receive a deformable rivet, the method comprising:

inserting a portion of the axle tube in the opening of the axle housing;

inserting the deformable rivet through the aperture in the neck of the axle housing causing the deformable rivet to engage the axle tube;

shifting a hot forging electrode into engagement with the deformable rivet, the hot forging electrode being movable relative to the deformable rivet;

heating the deformable rivet with power output from a resistance heating power supply in electrical communication with the hot forging electrode and the first workpiece;

monitoring position of the hot forging electrode to determine rivet deformation; and regulating the power output of the resistance heating power supply as a function of rivet deformation and regulating a force exerted by the hot forcing electrode on the deformable rivet when the hot forging electrode reaches a predetermined position to ensure that the deformable rivet is properly welded to the axle tube.

* * * * *

UNITED STATES PATENT AND TRADEMARK OFFICE
CERTIFICATE OF CORRECTION

PATENT NO. : 5,828,028
DATED : October 27, 1998
INVENTOR(S) : DIMITRIOS G. CECIL It is certified that error appears in the above-identified patent and that said Letters Patent is hereby corrected as shown below:

Column 9, Line 24, Claim 1, delete "forcing" and insert --forging--.

Column 10, Line 47, Claim 9, delete "forcing" and insert --forging--.

Signed and Sealed this

Fourth Day of May, 1999

Attest:

Q. TODD DICKINSON

*Attesting Officer*   *Acting Commissioner of Patents and Trademarks*